INVENTOR:
JAMES W. MILLER
BY Newell Pottorf
ATTORNEY

INVENTOR:
JAMES W. MILLER
BY Newell Pottorf
ATTORNEY

Feb. 15, 1966 J. W. MILLER 3,235,791

GAIN CONTROLS USING SILICON DIODES, A D.C. CONTROL SOURCE AND AN A.C. BIAS SOURCE

Filed Sept. 5, 1961 4 Sheets-Sheet 3

INVENTOR:
JAMES W. MILLER
BY Newell Pottorf
ATTORNEY

INVENTOR:
JAMES W. MILLER
BY Newell Pottorf
ATTORNEY 3,235,791

GAIN CONTROLS USING SILICON DIODES, A D.C. CONTROL SOURCE AND AN A.C. BIAS SOURCE

James W. Miller, Tulsa, Okla., assignor to Pan American Petroleum Corporation, Tulsa, Okla., a corporation of Delaware Filed Sept. 5, 1961, Ser. No. 136,062
3 Claims. (Cl. 323—66)

This invention relates to gain controls and is directed to gain controls of the type useful for recording signals of widely varying amplitude like those encountered in seismic geophysical surveying. More specifically, the invention is directed to an improvement in gain-controlling attentuators of the type utilizing silicon diodes as non-linear variable-resistance elements.

Certain characteristics of the signals received in seismic-geophysical exploration greatly increase the difficulty of making satisfactory records. For one thing, the range of amplitudes to be accommodated is very large. For another, the rate of change of amplitudes is frequently quite high, requiring a speed of response of the gain-controlling circuits which corresponds to a frequency response only slightly less than the signal frequencies themselves. Besides, markedly different amplitude-versus-time functions may be required for satisfactory recording at two points even though their separation is not great. Accommodating the wide range of signal amplitudes generally requires that non-linear devices be used; but they must be used in such a way that their non-linearity does not cause substantial distortion. Accurate interpretation of the data requires that distortion of wave amplitudes and phases be avoided as completely as possible.

These problems have for the most part been solved with reasonable satisfaction in the past by the use of thermionic diodes as gain-controlling attenuator elements in the manner taught in McManis-Cooper Patent 2,663,002. Thermoionic diodes, however, require a power supply of substantial capacity, which is a disadvantage in field recording apparatus which must be as compact and easily portable as possible. The characteristics of thermionic diodes often change differently and non-uniformly with age and use, so that circuits once adjusted or balanced may, in time, become unbalanced, causing distortion and other undesirable effects. Other types of non-linear devices, such as semi-conductor diodes and, in particular, silicon diodes, appear to offer certain advantages for this use, such as relatively long life, stability, relative freedom from thermal drift, small size, and low power consumption. Offsetting these advantages, however, is a tendency to distort high-level signals to a substantially greater degree than do thermionic diodes. Thus, the rang of signal levels that can be recorded with satisfactory fidelity by systems utilizing silicon diodes as gain-controlling elements is unduly restricted.

In view of the foregoing, it is a primary object of my invention to provide a novel and improved gain-control system utilizing silicon diodes as the non-linear gain-controlling elements, having a substantially reduced tendency to distort high-level signals. A further object is to provide a silicon-diode attenuating circuit for use as the variable-gain element of an amplifying channel, which element is capable of controlling without substantial distortion an increased range of signal levels, as compared with prior-art circuits. Other and further objects, uses, and advantages of the invention will become apparent as the description proceeds.

Briefly stated, I have found that the tendency of silicon diodes, when used as attenuating elements in gain controls, to produce distortion in the presence of large signals, is markedly reduced by applying to the gain-controlling element in parallel with the signals an alternating-current bias voltage. This bias voltage is preferably of constant amplitude and of a frequency which is sufficiently high so that it will not be recorded by the signal-recording elements. The exact amount and the frequency of this alternating-current bias do not appear to be critical, as amounts corresponding to what is from about ½ to 2 times the normal maximum signal level have been employed successfully, at a frequency of 2,200 cycles per second. Any frequency high enough to have negligible effect on the recording element appears to be suitable as long as it is not so high that stray circuit capacities become of low impedance.

This will be better understood by reference to the accompanying drawings forming a part of this application and showing typical embodiments of the invention. In these drawings, FIGURE 1 is a generalized block diagram of one type of amplifying circuit to which the invention is applicable;

Figure 1:
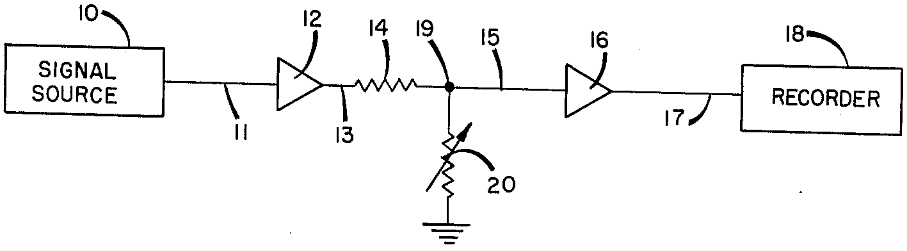

Referring now to these drawings in detail, one type of amplifying circuit to which the invention is applicable is shown in block-diagram form in FIGURE 1. Thus, the signal source 10, which is seismic geophysical exploration is typically a seismometer or seismometer group at a definite location with respect to a seismic wave source, is connected by a lead 11 to a preamplifier 12 of one or more stages of amplification. The output of amplifier 12 is transmitted by a lead 13 through a series resistance 14 to an input lead 15 of an amplifier 16 consisting of one or more stages. By a lead 17 the output of amplifier 16 is transmitted to a recorder 18 for recording in any appropriate desired form such as a magnetic-record trace, a variable-density or variable-area photographic trace, or as an oscillographic or "wiggly-line" photographic trace. For regulating the gain of the system, a variable shunt resistance 20 is connected from a point 19 of lead 15 to ground.

It will be apparent that this arrangement of the series resistance 14 and the variable shunt resistance 20 forms a modified L-pad attenuator, with the attenuation varying from a negligible amount for values of the resistance 20 that are large relative to resistance 14, to a quite large attenuation when the resistance 20 assumes resistance values small relative to that of resistance 14. Although resistance 20 is the only variable attenuating element shown, this is only to simplify the description as the resistance 14 could be variable also, or in the alternative. The over-all or maximum gain of the system provided by amplifiers 12 and 16 is normally sufficient to record the smallest significant signals from source 10 with a satisfactorily readable minimum amplitude by the recorder 18, while all signals larger than this minimum are attenuated by the combined action of resistance 14 and variable shunt resistance 20, so as to be recorded at a somewhat larger amplitude than the minimum but still without exceeding the dynamic range of the record medium.

Figure 2:
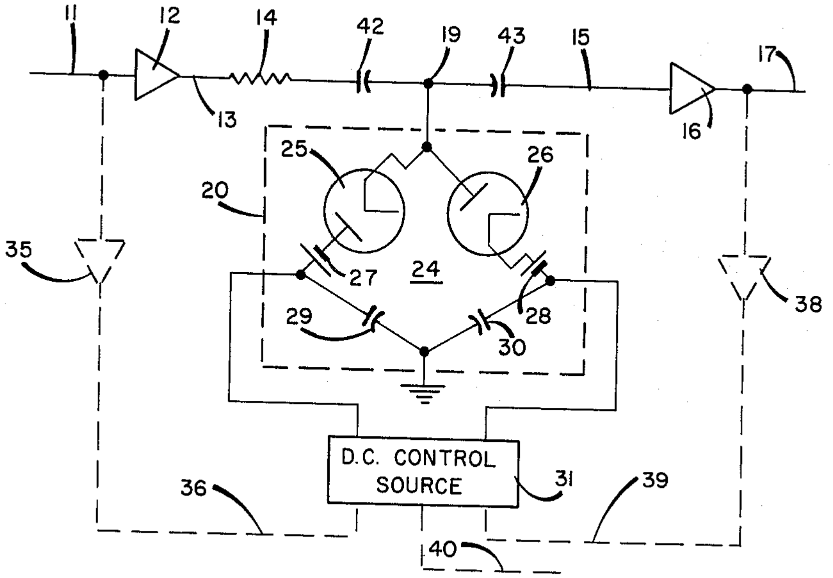
FIG.-2 PRIOR ART
FIGURES 2 and 3 are diagrams of two prior-art attenuating circuits utilizing thermionic diodes as variable resistance units in the same manner as silicon diodes are utilized in the present invention.

In FIGURE 2 is shown in more detail a prior-art amplifying and attenuating circuit of the type to which the invention is applicable. Thus, shunt 20 is typically a bridge circuit 24, having a pair of thermionic diodes 25 and 26 and bias voltage sources 27 and 28 connected in series in the two adjacent arms forming one branch of the bridge, and a pair of capacitors 29 and 30, connected in series in the two adjacent arms forming the other branch of the bridge. The bridge 24 performs the function of the variable resistor 20 in the direction of the bridge diagonal taken from the junction point between the diodes 25 and 26 to the junction point between the capacitors 29 and 30, while the value of the resistance provided by the bridge 24 depends upon the direct-current potential applied across the other bridge diagonal from the junction joint between one condenser and one diode arm to the junction point between the other condenser and the other diode arm. This potential is supplied by a controllable source 31 generally in opposition to the negative bias provided by the bias sources 27 and 28, though the polarity of source 31 may differ in different circumstances of use.

The magnitude of the direct current control voltage supplied by the source 31 is typically determined in any one or a combination of at least three different ways. One type of forward-feeding automatic control in accordance with the input signal level, monitors the voltage present on the input lead 11, amplifying it by a separate amplifier 35, and applying it to the source 31 over the control input lead 36 to generate the proper magnitude of control voltage. Another type of automatic control may take the voltage on the lead 17 going to recorder 18 and endeavor to hold its range of variations to a suitably small value by amplifying, rectifying, and feeding backward a portion of the recorded signal voltage through an amplifier 38 over the lead 39. Or, the system gain can be varied as some desired function of time, independently of the signals transmitted through the amplifier channel, by a voltage applied over a lead 40 from any suitable external source. Obviously, if preferred, any two, or all three means of controlling the voltage of source 31 can be utilized simultaneously, each type of control contributing in various desired degrees in establishing the output voltage of source 31 applied to bridge 24.

In accordance with U.S. Patent 2,663,002, the point 19 of lead 15 is preferably isolated for direct current by condensers 42 and 43, of a size to offer negligible impedance to the signal frequencies. This isolation of point 19 from any direct-current path to ground markedly improves the degree of balance of bridge 24 by equalizing the properties of individual thermionic diodes 25 and 26, both as between themselves and in relation to other parallel amplifying channels, not shown.

Figure 3:
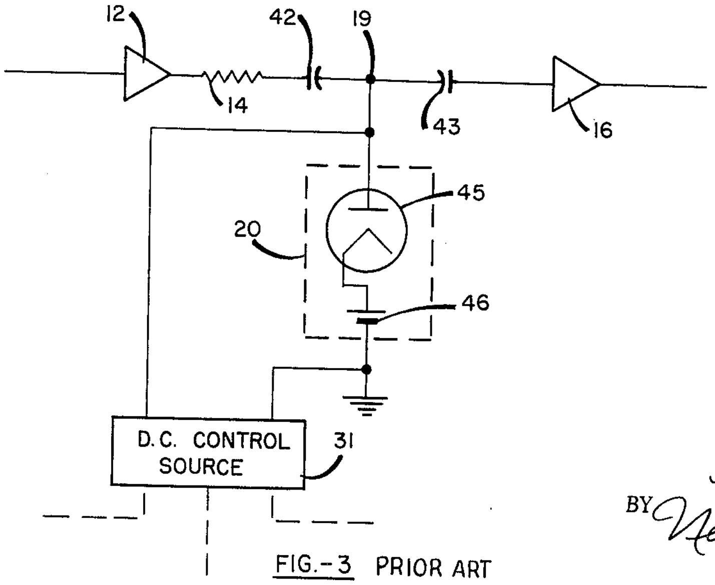
FIG.-3 PRIOR ART

An alternative attenuating system, as shown in FIGURE 3, may utilize a single thermionic diode 45 and bias source 46 as the shunt resistance 20. Control voltage from the source 31 is applied to the diode 45 and source 46 to aid or oppose the voltage of bias 46, depending on the required resistance function.

Figure 4:
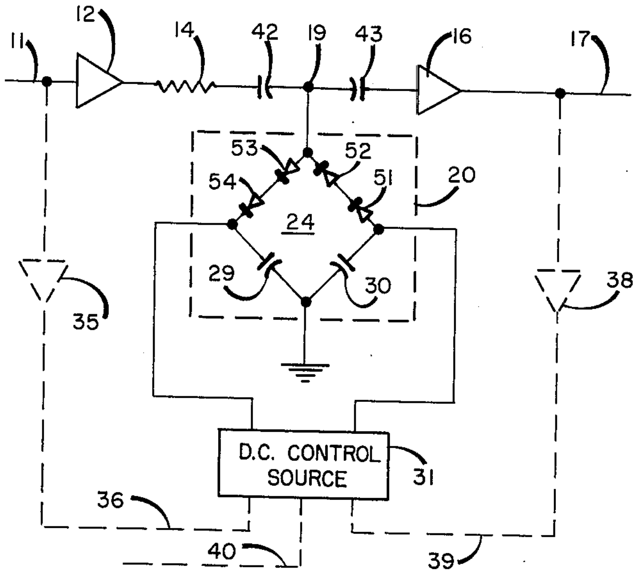
FIGURE 4 is a diagram of an ampilfying and attenuating circuit employing semi-conductor silicon diodes as variable resistance units.

In FIGURE 4, is shown an attenuating system like that of FIGURE 2 in all respects except that each thermionic diode and its corresponding bias source in the bridge 24 is replaced by a pair of semi-conductor diodes, preferably silicon diodes. This places four silicon diodes 51, 52, 53, and 54, in series in the upper branch of the bridge 24. Two silicon diodes in series of the type employed are necessary to approximate the effective range of variable resistance provided by each of the two thermionic diodes. Depending on the characteristics of the particular type of silicon diodes used, however, each bridge arm contains as many in series as are needed to provide the required range of attenuator resistance.

The simple substitution of silicon diodes as in this figure for the thermionic diodes of FIGURE 2 is satisfactory in some respects, but it has the serious difficulty that at high signal levels there is appreciable distortion of the signals being attenuated. Overloading or strong-signal distortion seems to occur more readily in this system, with more pronounced distortion, than in the case of the system of FIGURE 2, using thermionic diodes.

Figure 5:
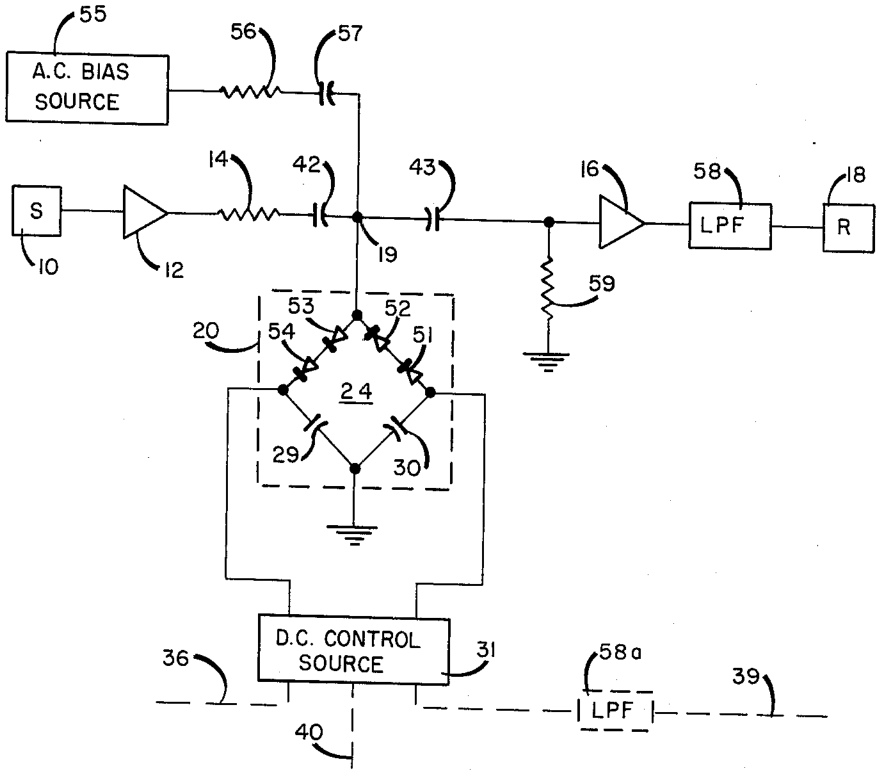
FIGURE 5 is a diagram of a circuit embodying the preferred form of the invention.

I have found, however, that this problem of overload distortion is substantially avoided or reduced by a system as shown in FIGURE 5 which is the preferred embodiment of the invention. By applying to the point 19, in parallel with the signals from source 10 arriving through the resistance 14, an alternating-current bias voltage of appropriate magnitude and of substantially higher frequency than the signals to which the recorder 18 is responsive, distortion at any given signal level can be reduced by a large factor. In the typical case, a distortion of over 3 percent by signals of a given level is reduced to less than one half percent in the presence of this alternating bias, all other conditions remaining constant. Conversely, a much higher signal level can be attenuated without exceeding a given amount of distortion. In other words, the system of FIGURE 5 is not only markedly superior to that of FIGURE 4, but is in every way equal to or better than the thermionic diode system of FIGURE 2 without its attendant disadvantages of power supply and the like. The alternating bias voltage supplied by the source 55 is connected to point 19 in the same manner as the signal present on lead 13, through a resistor 56 and condenser 57 in series. Typically, the bias voltage measured at point 19 is 30 millivolts at a frequency of 2200 cycles per second. If recorder 18 is responsive to the frequency of source 55, then a low-pass filter 58 excluding the bias frequency but freely passing all signal frequencies is inserted at any appropriate point between junction 19 and recorder 18. Likewise, a similar filter **58*a* may be required in lead 39 to prevent source 55 from affecting the output of control source 31. In considering the action of bridge 24 as the variable element of the attenuator circuit, it is usually necessary to note that the amplifier 16 has a finite resistance to ground which for signal frequencies acts as a shunt resistance in parallel with resistor 20. This is represented in FIGURE 5 as the resistance 59**.

Figure 6:
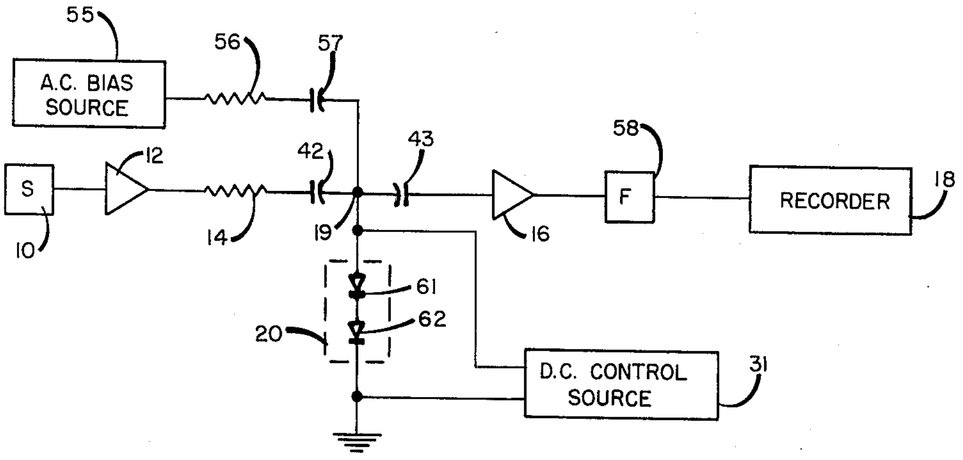
FIGURE 6 is a diagram of an alternative circuit embodying the invention.

By analogy with FIGURE 3, as is shown in FIGURE 6, the variable shunt 20 may comprise simply one or more silicon diodes 61 and 62 connected in series directly from point 19 to ground. Here also, overload or large-signal distortion can be greatly reduced by the presence of alternating bias from source 55, fed to point 19 through resistor 56 and condenser 57.

Figure 7:
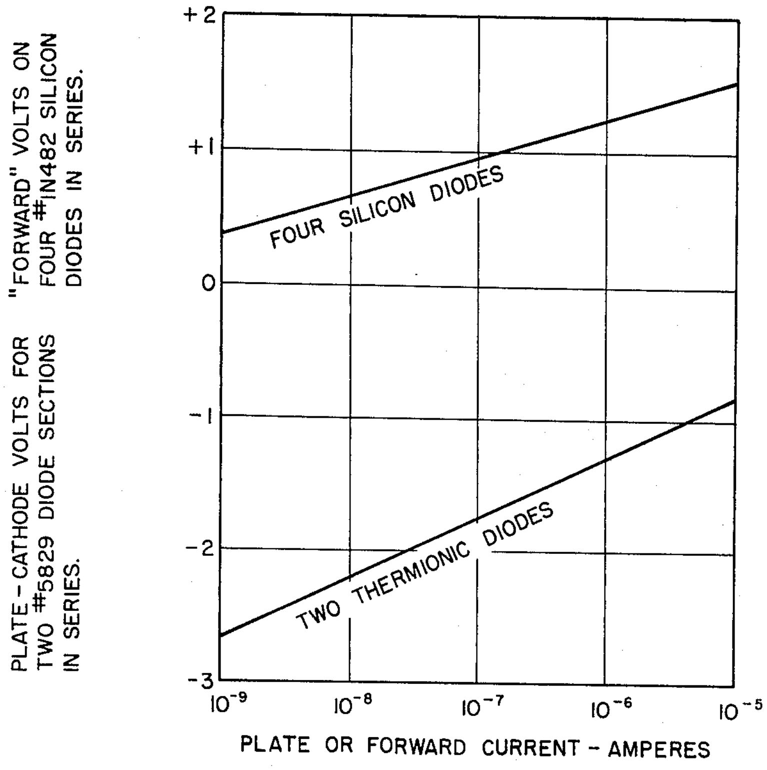
FIGURE 7 is a graph of typical voltage and current relations of thermionic and of semi-conductor silicon diodes utilized in the preceding circuit figures.
Figure 8:
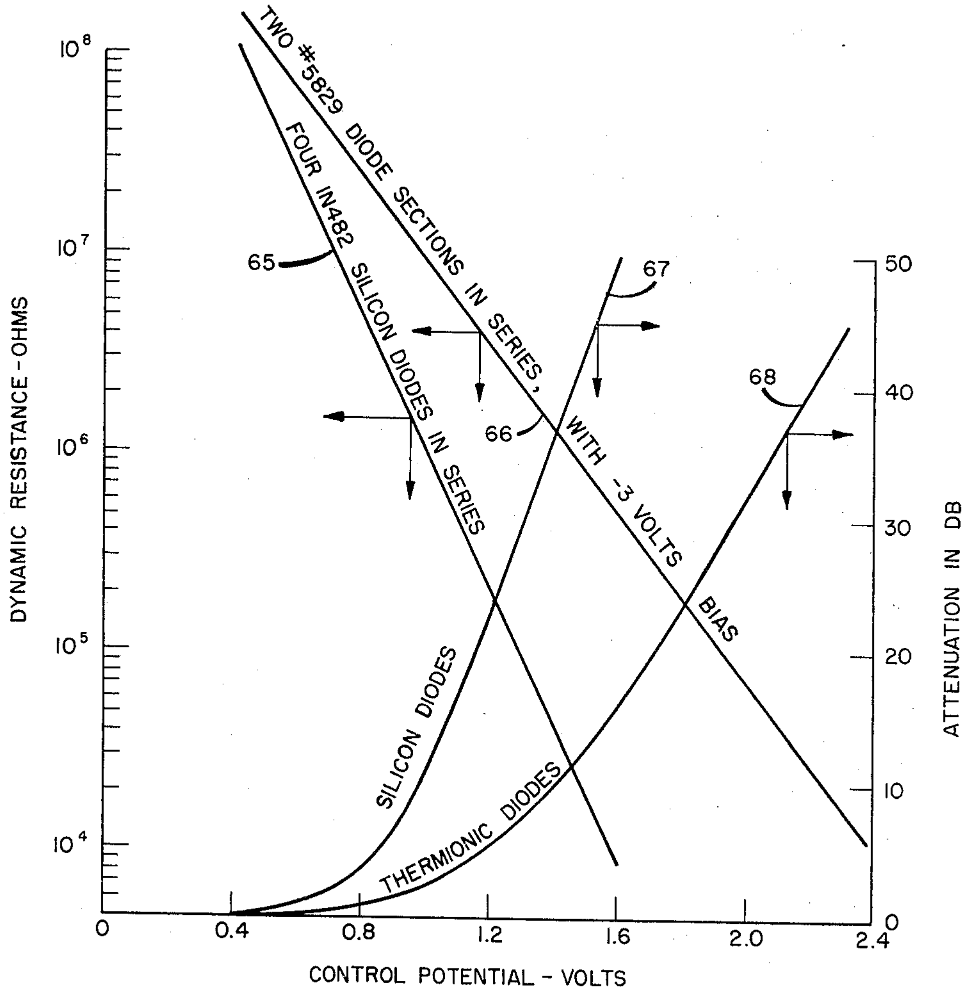
FIGURE 8 is a graph showing typical resistance and attenuation values of various illustrated attenuator circuits.

The manner in which thermionic and silicon diodes function as wide-range variable resistors may be understood by reference to FIGURES 7 and 8. FIGURE 7 shows the relationships between applied voltages and resulting current flow for four Type 1N482 silicon diodes connected in series and for two Type 5829 thermionic diode sections similarly connected in series. While these curves may not exactly match the characteristics of particular diodes of these types, they are typical or average examples. From the fact that the thermionic diode voltages are negative in producing the ranges of current plotted, the presence of a negative bias larger than the control voltage of source 31 may be inferred. The logarithmic relation of the current to the plate-cathode voltage no longer holds true for positive values of the plate-cathode voltage for thermionic diodes. In other words, the region of the plate-voltage, plate-current characteristic shown in this figure is the "electron initial velocity" region referred to in Patent 2,663,002.

From the greater slope of the thermionic diode curve shown by FIGURE 7, relative to the silicon diode curve, it is apparent that a relatively larger change in voltage is required to produce a given current change in the two thermionic diodes than in the four silicon diodes. Conversely stated, the silicon diodes are more responsive to voltage changes than are the thermionic diodes.

This is shown in a somewhat different manner, in FIGURE 8 by the curves 65 and 66. These curves show the dynamic or alternating-current resistance of the silicon diodes and of the thermionic diodes, respectively, as a function of the control potential supplied by the source 31. These are the effective resistance values, given by the ordinates on the left of the figure, for alternating signal voltages that are small compared to the control potentials. These values of resistance correspond to the slope or the derivative of the curve of direct-current resistance variation with control voltage, as a function of the latter, since it is the slope of this curve rather than the absolute value of the static resistance which affects the signal amplitude.

From the greater slope of curve 65 for silicon diodes than curve 66 for thermionic diodes, the reason for the greater tendency of the silicon diodes to cause distortion may be in part understood. It is simply that the signal valtages may themselves become sufficiently large to cyclicly change the dynamic resistance of the silicon diodes in the same way as varying the control potential does. In other words, the assumption that the dynamic resistance is determined only by the control potential does not hold true for signals of more than a certain minimum amplitude. The reason why this assumption does appear to hold true for signals of substantially larger amplitude, when alternating-current bias is present along with the signals, is not fully understood, but it appears nevertheless to be true.

The curves 67 and 68, taken with reference to the right-hand ordinates of FIGURE 8, show the attenuation as a function of the control potential for silicon diodes and for thermionic diodes respectively assuming a value for resistor 14 of 1.0 megohm and for resistor 59 of 2.0 megohms. As is believed evident, the silicon diodes are very effective attenuator elements over a wide range of attenuation with only moderate changes in the control potential. However, it is only the presence of the alternating-current bias that allows the silicon diodes to be used in the presence of large-amplitude signals without excessive distortion. Otherwise, they can be operated only over a lower portion of the attenuation range shown by the curve 67 and are inferior to thermionic diodes in lack of distortion.

While the invention has been described with reference to the foregoing specific details and embodiments, it is apparent that still further details and modifications will be apparent to those skilled in the art. In particular, it is to be expected that the noted improvement in distortion characteristics will not be limited to the specific type of silicon diodes described, but is quite likely to exist for many such types. Accordingly, the invention should not be considered as limited to the details described, but its scope is properly to be ascertained from the appended claims.

I claim:

1. In an alternating-current signal-channel attenuator circuit comprising a resistance in series in a signal-carrying lead and a shunt resistance connected between said lead and ground, wherein at least one of said resistances is variable and non-linear and comprises at least one silicon diode means for applying a direct-current potential to said diode to vary its effective resistance for signals, said direct-current potential being large compared to the maximum signal voltage to be attenuated, the improvement which comprises means for applying also to said diode in parallel with said signals a constant alternating-current bias small compared with said direct-current potential, of from 0.5 to 2 times the maximum signal amplitude to be attenuated and of a frequency markedly different from and substantially above the signal frequencies said channel is adapted to record, said bias-applying means being connected to the same point at which said signals are applied to said variable resistance.

2. In a signal-channel attenuator circuit comprising a first series resistance in a signal-carrying lead and a variable non-linear shunt resistance connected between said lead and ground, said shunt resistance comprising a bridge circuit with one diagonal acting as said variable shunt resistance and a source of direct-current control potential large compared to the maximum signal voltage to be attenuated connected across the other diagonal of said bridge, one branch of said bridge comprising a plurality of silicon diodes connected in series with respect to said control potential and in parallel to ground with respect to said signal potentials, the improvement comprising an alternating-current bias source of a frequency substantially above the signal frequencies said channel is adapted to record, and a series resistance connected between said bias source and the midpoint of said silicon-diode bridge branch sufficient to adjust the bias-source voltage at said midpoint to a constant value that is small compared with said direct-current control potential between about 0.5 and 2 times the maximum signal adapted to be attenuated by said circuit.

3. In a signal-channel attenuator circuit comprising a first series resistance in a signal-carrying lead and a variable non-linear shunt resistance connected between said lead and ground, said shunt resistance comprising at least one silicon diode and a source of direct-current control potential which is large compared to the maximum signal voltage to be attenuated connected to said diode to vary its effective resistance for signals, the improvement comprising a constant alternating-current bias voltage source small compared with said direct-current control potential, of from about 0.5 to 2.0 times the maximum signal amplitude to be attenuated and of a frequency substantially above the signal frequencies said channel is adapted to record, and a lead connecting said bias source to the same point at which said signals are applied to said shunt resistance.

References Cited by the Examiner

UNITED STATES PATENTS

| | | | |
|---|---|---|---|
| 2,775,714 | 12/1956 | Curtis | 307—88.5 |
| 2,833,980 | 5/1958 | Hedgcock et al. | 323—65 |
| 2,929,015 | 3/1960 | Fleming | 323—24 |
| 2,956,234 | 10/1960 | Olsen | 323—66 |
| 3,115,601 | 12/1963 | Harris | 323—66 |
| 3,127,577 | 3/1964 | LaPointe | 307—88.5 |

LLOYD McCOLLUM, *Primary Examiner.*